United States Patent [19]

Rogut

[11] Patent Number: 4,477,938
[45] Date of Patent: Oct. 23, 1984

[54] MATERIAL WHICH HAS ABRASIVE PROPERTIES AND METHOD OF MAKING SAME

[76] Inventor: Samuel Rogut, 504 Bowenvale, Beach Rd., Cape Town, Cape Province, South Africa

[21] Appl. No.: 427,711

[22] Filed: Sep. 29, 1982

[30] Foreign Application Priority Data

Feb. 18, 1982 [GB] United Kingdom ............... 8204816

[51] Int. Cl.³ .................... A47L 13/10; B24D 11/02; B32B 7/00
[52] U.S. Cl. ........................................ 15/118; 51/400; 51/401; 15/209 R; 156/82; 428/102; 428/103; 428/104; 428/234; 428/300; 428/316.6; 428/409
[58] Field of Search ............... 15/118, 209 R, 209 B, 15/244 R, 244 B, 244 C; 51/400, 401; 156/82; 428/234, 235, 300, 316.6, 102, 103, 104, 198, 409

[56] References Cited

U.S. PATENT DOCUMENTS

| | | | |
|---|---|---|---|
| 3,506,529 | 4/1970 | Sanders | 428/92 |
| 3,862,522 | 1/1975 | Mednick | 15/118 |
| 4,360,554 | 11/1982 | Campbell et al. | 428/234 |
| 4,381,330 | 4/1983 | Gotomyo et al. | 428/300 |

*Primary Examiner*—William J. Van Balen
*Attorney, Agent, or Firm*—Fitch, Even, Tabin & Flannery

[57] ABSTRACT

A method of producing a cleaning cloth having abrasive properties is disclosed. The method comprises passing a composite material consisting of a needle bonded fabric, a woven or knitted fabric and a layer of foamed synthetic plastics material past a heat source which is preferably a gas flame. The gas flame is directed at the stitches of the exposed face of the needle bonded fabric and the layer of knitted or woven fabric is sandwiched between the needle bonded fabric and the layer of foamed material. The stitches of the fabric form hard, abrasive nodules the arrangement of which varies with the stitch pattern.

7 Claims, 3 Drawing Figures

MATERIAL WHICH HAS ABRASIVE PROPERTIES AND METHOD OF MAKING SAME

This invention relates to the manufacture of a material which has abrasive properties and also to scouring and cleaning cloths made from such material.

BACKGROUND TO THE INVENTION

Many forms of cleaning and scouring cloth have been proposed. Some incorporate abrasive particles on a substrate, the abrasive particles imparting the requisite cleaning and scouring properties to the cloth. Others employ a knitted or woven mass of fibres, the hardness of the fibres being used to achieve the requisite properties.

An object of the present invention is to provide a simple cleaning and scouring cloth which can be used not only on crockery, cutlery etc. but also on the human body.

BRIEF DESCRIPTION OF THE INVENTION

According to one aspect of the present invention there is provided a method of manufacturing a material which has abrasive properties, which method comprises applying heat to one face of a needle bonded fabric, the heat converting all or a proportion of the stitches into hard abrasive nodules.

The fibres are preferably a polyalkylene or a polyester but can be of any suitable high molecular weight synthetic plastics material which forms hard abrasive nodules when subjected to heat. Polypropylene is the preferred material.

The heat can be radiated onto said one face from electrical heating elements but it is preferred that a gas flame directed at said one face be used.

The distribution of the nodules varies in dependance on the stitch pattern.

The formation of nodules can be greatly enhanced by providing a heat insulating layer adjacent the other face of the needle bonded fabric before heat is applied to said one face. The heat insulating layer is preferably of composite form and comprises a knitted or woven fabric sandwiched between said layer of needle bonded fabric and a layer of foamed plastics material. The closer the knit or weave of the knitted or woven fabric the harder the nodules.

Where said needle bonded fabric is in web form, it can be fed from a feed roll to a take-up roll and the heat can be applied to the part of the web which lies between the two rolls.

Said needle bonded fabric can initially be approximately 2 mm thick.

The size of the nodules formed, as opposed to their arrangement, can be controlled to some extent by the nature of the thread used in the needle bonding process. Thus it appears that the size of nodule increases with the size of the thread used in the needle bonding process.

According to another aspect of the present invention there is provided a scouring and cleaning cloth of composite construction and comprising a piece of woven or knitted fabric, a layer of foamed synthetic plastics material, and a needle bonded fabric which has been heated to form hard abrasive nodules, said foamed synthetic plastics material layer being between said piece of woven or knitted fabric and said needle bonded fabric and the nodules being on the exposed face of said needle bonded fabric.

The needle bonded fabric, layer and piece of woven or knitted fabric can be secured together by adhesive or by stitching, or by a combination of adhesive and stitching. In a specific constructional form the needle bonded fabric, layer and piece of fabric are adhered to one another and then stitched around the edges thereof to prevent fraying.

BRIEF DESCRIPTION OF THE DRAWINGS

For a better understanding of the present invention, and to show how the same may be carried into effect, reference will now be made, by way of example, to the accompanying drawing in which.

DETAILED DESCRIPTION OF THE DRAWINGS

Figure 1:
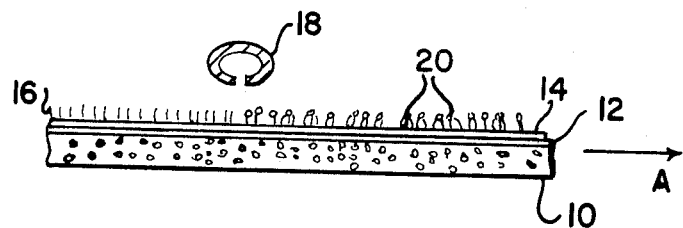
FIG. 1 diagrammatically illustrates the production of an abrasive material in accordance with the present invention.

Referring firstly to FIG. 1, this illustrates a composite material. Reference numeral 10 designates a backing layer of foamed synthetic plastics material and reference numeral 12 indicates a knitted or woven fabric which is sandwiched between the layer 10 and a needle bonded fabric generally designated 14. The needle bonded fabric includes a plurality of stitches 16 which are distributed in a pattern over the exposed face of the needle bonded fabric. The pattern depends on the arrangement of the needles in the needle bonding machine. This process is also referred to as needle stitching.

Between the backing layer 10, the knitted or woven fabric 12 and the needle bonded fabric 14 there are suitable adhesives. For example, between the layer 10 and the knitted or woven fabric 12 there can be an adhesive which provides a permanent or almost permanent bond. Between the knitted or woven fabric 12 and the needle bonded fabric 14 there is an adhesive the nature of which is such as to prevent movement of the two components relatively to one another but which enables the components 12 and 14 to be separated from one another after heat treatment in the manner yet to be described. The laminate constituted by the layer 10 and the knitted or woven fabric 12 can be re-used indefinitely.

In use, the composite material described is displaced, in the direction indicated by the arrow A, beneath a gas burner 18. The composite material can be in the form of a reel and can be unwound from the reel by suitable rolls (not shown). The flame of the burner 18 is directed downwardly onto the needle bonded fabric 14. The flame heats the stitches and the effect of this is to cause the stitches to 'rise' and form a plurality of abrasive nodules 20.

The temperature at which heating takes place and the time determines the proportion of the stitches which are converted to nodules.

After passing under the burner 18, the needle bonded fabric 14 is peeled off the knitted or woven fabric 12, the laminate constituted by the knitted or woven fabric 12 and the layer 10 passing to one take-up roll and the needle bonded fabric to another roll. The layer 10 and knitted or woven fabric 12 are subsequently re-used as explained.

Figure 2:
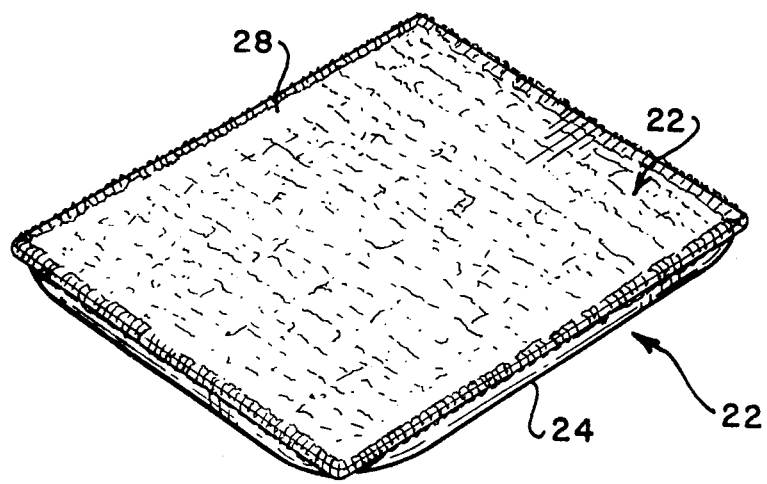
FIG. 2 is a pictorial view of one face of a scouring and cleaning cloth.
Figure 3:
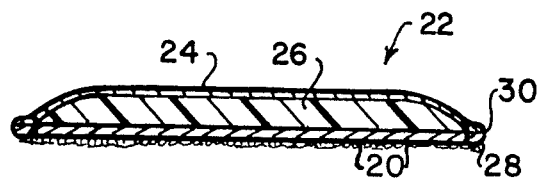
FIG. 3 is a transverse section through the scouring and cleaning cloth of FIG. 2.

Turning now to FIGS. 2 and 3, the scouring and cleaning cloth illustrated is generally designated 22 and comprises a rectangular piece 24 of knitted or woven fabric, a layer 26 of foamed synthetic plastics material (only visible in FIG. 3) and a piece of needle bonded fabric 28 treated as described above.

The piece 24 is of soft fabric of open weave so that water can readily permeate through it into the layer 26. The layer 26 is of soft foamed plastics material which will absorb and hold a supply of water.

The nodules 20 make the exposed face of the fabric 28 relatively rough. If the material of the fibres is, for example, polypropylene then there is some slight softening when the sheet is subjected to hot water.

The rectangular piece of fabric 24, the layer of foam synthetic plastics material 26 and the needle bonded fabric 28 can be adhered to one another over all or a substantial part of their surface area. To prevent fraying around the edges the three layers are stitched together as shown at 30. Of course, if desired, the stitching can be omitted if the adhesive is such that there is sufficient security against delamination. Also, if desired, the adhesive can be omitted if it is believed that stitching will hold the three layers in their correct position.

In use of the scouring and cleaning cloth, the fabric 28 can be used to scour a deposit off a surface that would be damaged by the use of wire wool or an abrasive compound. The piece of fabric 24 can be used for the final cleaning of such a surface, and can also be used simply for wiping down and cleaning other surfaces which do not have a deposit on them. The layer 26 tends to retain a supply of water in the cloth.

The cloth can also be used as a replacement for items such as pumice stones when showering or bathing.

Instead of attaching the heat treated needle bonded fabric to soft materials as described, it can be secured to a block of a material such as wood.

It is possible to harden the nodules by sticking the treated needle bonded fabric to a foam layer using a contact adhesive, such as a rubber based contact adhesive. The adhesive appears to permeate the needle bonded fabric and harden the nodules.

I claim:

1. A method of manufacturing a material which has abrasive properties which method comprises fabricating a composite structure comprising a needle bonded fabric the fibres of which are of polypropylene or polyester, a backing layer of foamed synthetic plastics material and a knitted or woven fabric sandwiched between the foamed plastics material and the needle bonded polypropylene or polyester, and applying heat to the exposed face of said needle bonded polypropylene or polyester to form hard abrasive nodules.

2. A cleaning cloth of composite construction and comprising a piece of woven or knitted fabric, a layer of foamed synthetic plastics material, and a needle bonded fabric which has been heated to form hard abrasive nodules, said foamed synthetic plastics material layer being between said piece of woven or knitted fabric and said needle bonded fabric and the nodules being on the exposed face of said needle bonded fabric.

3. A cleaning cloth according to claim 2 in which said needle bonded fabric, layer and piece of woven or knitted fabric are secured together by adhesive or by stitching, or by a combination of adhesive and stitching.

4. A cleaning cloth according to claim 3 in which said needle bonded fabric, layer and piece of woven or knitted fabric are adhered to one another and then stitched around the edges thereof.

5. A cleaning cloth according to claim 2, 3 or 4, in which said fibres are of polypropylene.

6. A method of manufacturing a material which has abrasive properties, which method comprises applying heat to one face of a needle bonded fabric the other face of which as adhered to a woven or knitted textile fabric which itself is sandwiched between the needle bonded fabric and a layer of foamed synthetic plastics material, the heat converting all or some of the protruding fibers of the needle bonded fabrics into hard abrasive nodules.

7. A method as claimed in claim 6, in which said layer of foamed synthetic plastics material is adhered to said textile fabric, the bond between the textile fabric and the foamed synthetic plastics material being stronger than the bond between the needle bonded fabric and the textile fabric.

* * * * *